United States Patent Office 3,028,304
Patented Apr. 3, 1962

3,028,304
SOIL FUMIGATION
William A. Kreutzer, Modesto, Calif., assignor to Shell Oil Company, New York, N.Y., a corporation of Delaware
No Drawing. Filed Apr. 8, 1960, Ser. No. 20,834
4 Claims. (Cl. 167—39)

This invention relates to novel methods for soil fumigation. More particularly, it relates to methods for treating soils to destroy phytopathogenic fungi present therein, and to the resulting treated soils.

It is an object of this invention to provide novel methods for combatting soil phytopathogenic fungi. It is another object of this invention to provide economical methods for soil fumigation. It is yet another object of this invention to provide methods of soil fumigation which are highly effective in combatting soil phytopathogenic fungi without adversely affecting the growing plants. Other objects will become apparent as the description continues.

These and other objects are achieved by a method of treating soils inhabited with phytopathogenic fungi, which comprises introducing into the soil the compound acrolein in an amount toxic to said phytopathogenic fungi. The resulting soils admixed intimately with the acrolein are believed to be novel compositions of matter of improved utility for agricultural purposes because of the freedom from fungi.

While it is not intended that this invention be limited by any theoretical considerations, it is believed that the effectiveness of acrolein against soil phytopathogenic fungi is due to its reactivity with the chemical composition of the cells of the phytopathogenic fungi. More particularly, it is believed that acrolein is effective because of its reaction with SH— groups and amine groups of these soil-inhabiting fungi thereby upsetting their metabolism. This has the advantage that these soil-inhabiting fungi probably would not develop immunity to acrolein. In addition to this advantage acrolein has the advantage of being abundant, easy to apply and vaporizes in the soil at an ideal rate under the proper conditions. It is also an advantage that only a single application is usually required. Another advantage is that acrolein will effectively kill off certain types of weed seeds.

A simple but effective method for applying acrolein to the soil comprises punching holes in the soil at frequent intervals, as one foot apart, and pouring a measured amount into the holes and thereafter covering the hole. Another method of applying the acrolein comprises surface application in the form of dusts or sprays of solutions of acrolein. If desired, liquid diluents other than water may be used such as acetone, mineral seal oil, ethylene glycol, n-pentane, and the like. For large-scale operations, special applicators such as probes or chisel-type injectors may be used or the acrolein may be dripped into a furrow directly behind a plowshare or cultivator disc. If desired, the acrolein may be adsorbed or absorbed upon or in a solid carrier, such as clay, talc, activated carbon, or the like, and the impregnated solid worked into the soil by discing or harrowing. But in many cases, the acrolein is to be covered up so that it will diffuse into the atmosphere through the soil.

In order to obtain optimum yields per acre, the acrolein is preferably applied prior to seed planting. However, it may also be applied concurrent with the planting of the seeds. In this way the acrolein does its work and leaves the soil before it or the phytopathogenic fungi can harm the seedlings or the growing plants.

The depth below the surface at which the acrolein is applied will vary depending on the type of fungi present and the type of crop to be planted. Application 4 inches below the surface of the earth is adequate but as a generalization it may be stated that the most effective results are obtained when the acrolein is applied below the seed level up to about 6 inches although a practical maximum appears to be about 8 inches.

The dosage of the acrolein that is applied to the soil will vary depending on a number of factors as the degree and type of infestation, the nature of the soil, the crop, and the like. In most instances, it is found that application in rows at the rate of about 8 gallons per acre will substantially completely eliminate soil-inhabiting fungi. However, in some instances a considerably smaller quantity will be sufficient particularly where the degree of infestation is not as great. Irrespective of the degree of infestation when acrolein is applied in amounts ranging from about 0.1 to 0.5 gallon per acre, the count of soil-inhabiting fungi is substantially reduced. On the other hand, it may be necessary to apply acrolein in considerably larger quantities. It will appear from Table II that the yield of tomatoes is substantially increased when 20 gallons per acre of acrolein is applied to the soil. At 60 gallons per acre the yield is not as great but it produces a substantial improvement over untreated soil in reducing tomato wilt. Similarly high rates of application may be advantageously applied to high value crops.

In terms of concentration of the liquid acrolein mixed with the soil, about 20 parts by volume of acrolein per million parts by volume of the soil substantially reduces the count of soil fungi, while a concentration of about 100 parts by volume of liquid acrolein mixed with a million parts by volume of soil will substantially completely eliminate soil fungi. The higher dosages which may be advantageously applied to high value crops provide concentrations of acrolein in the soil of from about 100 to about 200, or even as much as 1000 parts of liquid acrolein by volume per million parts by volume of the soil.

The time at which the acrolein is applied to the soil may be varied depending on such factors as the moisture content of the soil, the quantity applied, and the like. It is a particular advantage of this invention that suitable conditions of soil temperatures and moisture content normally prevail just prior to planting. In general, however, it is found that application three days before planting is about the optimum although greater or lesser periods may be used with effective results.

The effectiveness of the methods of this invention is illustrated by the following tables.

Table I illustrates the effectiveness of acrolein against the pinto bean root rot organisms Rhizoctonia and Thielaviopsis.

Table I

| Treatment | Stand— Mean Number of Plants per Plot | Mean Disease Index | Mean Plant Weight (grams) |
|---|---|---|---|
| Control (no chemical) | 77.0 | 74.9 | 4.4 |
| Preplanting injection (3 days) 8 gallons/ acre, 4 inches below surface | 222.8 | 5.4 | 5.5 |
| Simultaneous planting row spray—1 gallon/acre 2 inches below surface | 98.0 | 30.5 | 5.3 |
| Simultaneous planting row spray—0.5 gallon/acre 2 inches below surface | 102.5 | 37.5 | 5.3 |
| Simultaneous planting injection—2 gallons/acre 4 inches below surface | 76.8 | 7.7 | 4.5 |

In the table, readings were made first by counting plants in all plots two weeks after planting. Approximately four weeks after planting (26 days), plants were harvested and root rot was determined by using a standard index method which comprises visual inspection and categorizing the degree of infection into a class of five units of 0, 25, 50, 75 and 100%. The percentage of disease is determined by the summation of the number of plants in a class times its class divided by the total number of plants. The yield in grams is determined by counting and weighing the harvested plants. The soil temperature at the time of treatment was about 75° F. All tests were conducted on Fresno sandy loam soil type. The acrolein was applied as a 10% solution by volume in mineral seal oil. From the above table it is seen that injection before planting at 4 inches below the surface at a rate of 8 gallons per acre produces highly satisfactory results. Comparative tests in which acrolein is applied at the time of planting indicates that the root rot is effectively controlled but phytotoxicity to the plants is greater when applied up to 4 inches below the ground level. However, at 8 inches below the ground level, as little as two gallons per acre of acrolein gives comparable control with no phytotoxicity.

Table II illustrates the effectiveness of acrolein in combatting tomato wilt.

Table II

| Treatment | Yield (ton/acre) |
| --- | --- |
| Control (no acrolein) | 11.0 |
| 20 gals./acre (6 inches below ground level) | 14.1 |
| 60 gals./acre (6 inches below ground level) | 13.8 |

In addition to the above, soil infestation by nematodes is lessened by the application of about 0.5 gallon per acre.

Other soil phytopathogens may be effectively controlled by the methods of this invention such as Pythium and Fusarium.

This application is a continuation-in-part of my application Serial No. 562,636, filed February 1, 1956, now abandoned.

I claim is my invention:

1. An agronomical practice which comprises introducing acrolein into soil infested with soil-inhabiting fungi in a concentration of approximately 0.1 to about 60 gallons per acre and thereafter planting crops in the treated soil.

2. An agronomical practice which comprises introducing acrolein into soil infested with soil-inhabiting fungi in a concentration of approximately 0.1 to about 60 gallons per acre and concurrently planting crops in the treated soil.

3. An agronomical practice which comprises introducing acrolein into soil infested with soil-inhabiting fungi at a distance up to about 8 inches below the seed level in a concentration of approximately 0.1 to about 60 gallons per acre and thereafter planting seed crops in the treated soil.

4. An agronomical practice which comprises introducing acrolein into soil infested with soil-inhabiting fungi at a distance up to about 8 inches below the seed level in a concentration of approximately 0.1 to about 60 gallons per acre and concurrently planting seed crops in the treated soil.

References Cited in the file of this patent

UNITED STATES PATENTS

| | | |
| --- | --- | --- |
| 2,441,553 | Britton | May 18, 1948 |
| 2,448,265 | Kagy | Aug. 31, 1948 |
| 2,555,796 | Krause | June 5, 1951 |

OTHER REFERENCES

Cupples et al.; J. Econ. Entom., vol 29, pp. 611–618 (1936).

Vollrath: Proc. Soc. Exp. Biol. and Med., vol. 36, 1937, pp. 55–58.

Brown: Insect Control by Chemicals, John Wiley, 1951, pp. 88 and 126.

Roark: U.S. Dept. Agr., Tech. Bull., No. 162, March 1929, pp. 1–3 and 20.

Frear: A Catalogue of Insecticides and Fungicides, Chronica Botanica Comp., 1948, vol. 1, p. 99.

Frear: Chemistry of Insecticides, Fungicides and Herbicides, 2nd ed., September 1948, pp. 108–122, Chronica Botanica Comp.